C. F. ECKART.
METHOD OF INCREASING THE YIELD AND REDUCING THE PRODUCTION COST OF SUGAR CANE.
APPLICATION FILED JUNE 25, 1917.
1,249,355.
Patented Dec. 11, 1917.
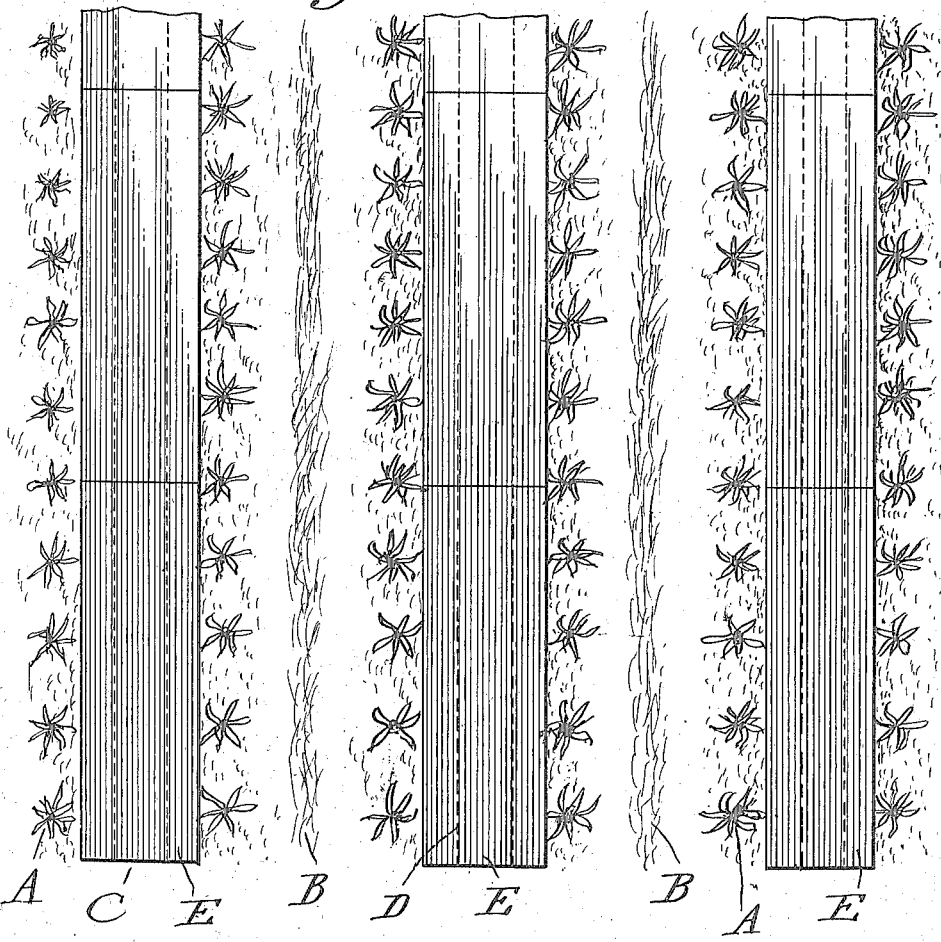
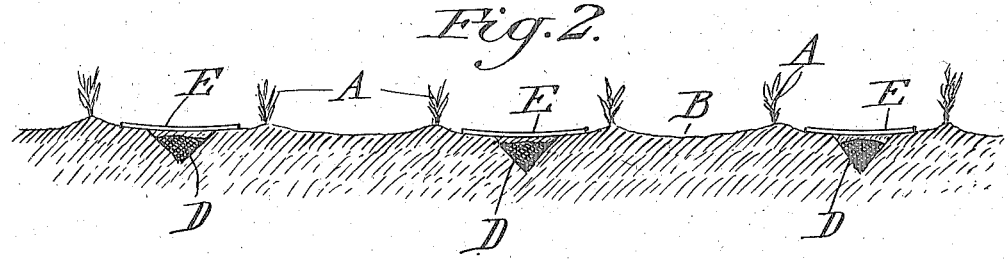

UNITED STATES PATENT OFFICE.

CHARLES FRANKLIN ECKART, OF OLAA, TERRITORY OF HAWAII.

METHOD OF INCREASING THE YIELD AND REDUCING THE PRODUCTION COST OF SUGAR-CANE.

1,249,355.  Specification of Letters Patent.  Patented Dec. 11, 1917.

Application filed June 25, 1917. Serial No. 176,833.

*To all whom it may concern:*

Be it known that I, CHARLES F. ECKART, a citizen of the United States, residing at Olaa, Hawaii, Territory of Hawaii, have invented certain new and useful Improvements in Methods of Increasing the Yield and Reducing the Production Cost of Sugar-Cane; and I do hereby declare the following to be a full, clear, and exact description of the invention, such as will enable others skilled in the art to which it appertains to make and use the same.

This invention relates to a method of increasing the yield and reducing the production cost of sugar-cane, and is in the nature of an improvement on the method disclosed in my co-pending application, Serial No. 118,507, filed September 5, 1916.

The invention disclosed in the above-referred to application consists, broadly, in applying a continuous, non-interstitial covering of fabric or paper to the ground in surface contact therewith at the alternate spaces between the rows of plants, while the present invention contemplates the creation of nitrate beds in the spaces between the cane rows and the superimposing of a covering of paper or fabric in surface contact with the ground to store the heat and the liberated nitrates, so that the latter will be accessible to the plants.

In carrying out the preferred form of this invention, the dried leaves, stalks, stems and other field refuse from the previous crop of cane, are raked from the alternate spaces between the cane rows, and the material thus removed is deposited on the remaining spaces between the rows. A shallow furrow is made, by means of a small plow or other suitable implement, longitudinally between the rows of plants in each of the cleared spaces, and in these furrows, a mixture of organic material, such as bagasse or filter press cake from the sugar factory, and a lime compound, such as lime oxid, lime hydrate or lime carbonate, is placed. The filling of the furrow is then completed by the addition of soil. Thus a core of a "lime-organic" mixture is formed down the middle of each of the cleared spaces. These cleared spaces are then covered with a continuous strip of opaque dark colored waterproof paper or fabric, and I have found in this connection that tar or asphaltum felt produce very satisfactory results. Each of these covering strips lies in surface contact with the ground and preferably reaches laterally across the entire space between the two immediately adjacent cane rows. While the method above described produces the best results, I have found that good results, although somewhat inferior to the results of the above method, can be obtained by applying the lime compounds alone, especially where the soils are strong in humus material and which are apt to be more or less sour. Moreover, good results, which are likewise relatively inferior, can also be obtained by applying the lime-organic mixture or the lime compounds alone directly to the surface of the ground in the alternate spaces between the rows. In this later event, it is desirable that the dressing be incorporated with the soil by harrowing, for instance.

Where the lime-organic mixture forms a friable core extending longitudinally of the space between the cane rows, the active nitrate bed is created in the following manner. Soil water gradually passes into and out of the core which contains lime in all of the forms of the method, and the water which leaves the core carries with it, lime in solution. This lime neutralizes the natural acidity of the soil, so that the farther the water proceeds from the core into the general mass of the soil, the smaller will be the amount of the active neutralizing agent or lime which it contains. Therefore, there is created around the core, a zone wherein the acidity of the soil has been neutralized by the lime to such an extent that the optimum conditions for the soil bacteria, which are responsible for the nitrification processes, are created. Under the action of the elevated soil temperature, which is due to the heat radiated from the thin dark colored covering superimposed on the soil above the core, the activity of the nitrifying organisms in the optimum zone is accelerated to a marked degree. This elevation of the soil temperature is supplemented, in the form of the invention where the lime and organic core are applied, by the heat of decomposition of the organic material, so that the core assumes the nature of a forcing or hot bed.

The leaching of the nitrates thus produced is prevented by the waterproof covering which rests on the surface of the ground, so that they are stored and conserved to meet the requirements of the growing cane. Thus, the growth of the cane plants, which are growing in a soil which is well stocked with humus material, need not be stimulated by the addition of nitrate containing fertilizers, and the alternate spaces between the rows will become, in effect, nitrate beds and storage places for the produced nitrates.

As it requires substantially three or four months for the young cane plants to attain sufficient growth to "close in" and shade the dark colored and impervious soil covering, the sun's rays will play on the covering during this entire time. As a consequence, a large amount of nitrate will be formed and stored up for use by the plants during the period when the covering is exposed to the direct effects of the solar heat. Owing to the generous supply of nitrates during the initial growth of the young plants, the growth will be quite vigorous and the "closing in" of the plants will take place earlier that otherwise would be the case. As a result, the weeding and other care-taking expenses will be greatly reduced.

After the plants have "closed in" over the spaces between the cane rows, the activity of the nitrifying organisms continues to remain highly accelerated above the normal, because of the continued presence of the optimum zone and the highly daily minimum temperatures caused by the presence of the soil covers, and the nitrates resulting are not leached from the soil during the growth of the crop, owing to the continued presence of the covers.

When sifted or screened bagasse or disintegrated press cake from the sugar factory are employed in the lime-organic mixture, the small amount of sugar which these factory residues contain is especially valuable in enhancing the activity of the nitrifying bacteria of the soil. Moreover, the nitrogenous matter contained in the bagasse and press cake is likewise of some food value to the micro-organisms. The chief function of the organic material is, however, to keep the core friable and in a suitably porous condition to give off the heat of decomposition. In view of the fact that the press cake contains fair quantities of lime along with the prepondering proportion of organic matter (much of which is readily nitrifiable), the material may, by itself, when used in large quantities, serve as the basis of a nitrate bed between the rows of plants. When, however, the lime compounds, such as oxid, hydrate or carbonate, are used, as in the preferred form of the method, they should be composed of fine particles as the best results are obtainable therefrom when the compounds are in this condition, although, as a matter of fact, good results may be obtained when coarse particles are used, but these results are inferior to those when the fine particles are used.

In the drawings, I have illustrated, diagrammatically, the manner in which my method is carried out, in which drawings:—

Figure 1 is a plan view illustrating the position of several of the covers on the alternate spaces between the rows of cane, and illustrating, in dotted lines, the position of the cores; and Fig. 2 is a sectional view illustrating the relative positions of the cores, the rows of plants and the superimposed covers.

In the drawings, a plurality of rows of sugar-cane A are illustrated, in the alternate spaces B, between which, the dried leaves, stalks, stems and other field refuse from the previous crop of cane are deposited, being raked from the remaining spaces C. A furrow is formed in each of these spaces C and extends longitudinally of the rows of plants, and, preferably, midway between the rows. In these furrows, the lime compound or compounds, or the lime-organic mixture is placed to form a core D and the filling of the furrows is completed by the addition of soil, as illustrated in Fig. 2. Superimposed on the ground between the rows of cane and overlying these cores of material, are the opaque dark colored, waterproof coverings E of paper or fabric, which coverings lie in surface contact with the ground for the purpose which has been previously clearly set forth. When the lime compound or compounds, or the lime-organic mixture are used and spread upon the surface of the ground in the spaces C between the cane rows, they are preferably thoroughly intermingled with the soil, which intermingling may obviously be accomplished by suitable harrowing. The covers are superimposed upon the soil thus treated.

What I claim is:—

1. The method of increasing the yield and reducing the production cost of rows of sugar-cane, which consists in establishing nitrate beds between certain of the rows of plants, and superimposing a covering thereon in surface contact with the ground.

2. The method of increasing the yield and reducing the production cost of rows of sugar-cane, which consists in establishing nitrate beds between certain of the rows of plants, and superimposing an opaque, dark colored, waterproof covering of paper or fabric thereon in surface contact with the ground.

3. The method of increasing the yield and reducing the production cost of rows of sugar-cane, which consists in establishing nitrate beds in alternate spaces between the rows of plants, and superimposing a covering thereon in surface contact with the ground.

4. The method of increasing the yield and reducing the production cost of rows of sugar-cane, which consists in establishing nitrate beds between certain of the rows, which beds extend longitudinally of the rows, and in superimposing a cover thereon in surface contact with the ground.

5. The method of increasing the yield and reducing the production cost of rows of sugar-cane, which consists in forming a lime-compound-containing core between certain of the rows of plants, and in superimposing a cover thereon in surface contact with the ground.

6. The method of increasing the yield and reducing the production cost of rows of sugar-cane, which consists in forming a lime-organic core between certain of the rows of plants, and in superimposing a covering thereon in surface contact with the ground.

7. The method of increasing the yield and reducing the production cost of rows of sugar-cane, which consists in forming a core containing a lime compound in the alternate spaces between the rows of plants, and superimposing opaque, waterproof covers thereon in surface contact with the ground.

8. The method of increasing the yield and reducing the production cost of rows of sugar-cane, which consists in forming a core containing a lime compound in the alternate spaces between the rows of plants, and superimposing opaque, dark colored waterproof covers thereon in surface contact with the ground.

9. The method of increasing the yield and reducing the production cost of rows of sugar-cane, which consists in forming in the alternate spaces between the rows, cores of lime-organic mixtures, and in superimposing covers thereon in surface contact with the ground.

10. The method of increasing the yield and reducing the production cost of rows of sugar-cane, which consists in creating nitrate beds in the spaces of ground between the cane rows by furrowing said spaces, applying a mixture of organic material and a lime compound to the furrows, completing the filling in of said furrows by the addition of soil, and in superimposing an opaque, dark colored, waterproof covering of paper or fabric in surface contact with the ground of said spaces.

11. The method of increasing the yield and reducing the production cost of rows of sugar-cane, which consists in creating nitrate beds in the spaces of ground between the cane rows by furrowing said spaces, applying a lime compound such as lime oxid, lime hydrate or lime carbonate to the furrows, completing the filling in of said furrows by the addition of soil, and in superimposing an opaque, dark colored, waterproof covering of paper or fabric in surface contact with the ground of said spaces.

12. The method of increasing the yield and reducing the production cost of rows of sugar-cane, which consists in creating nitrate beds in the spaces of ground between the cane rows by applying a mixture of organic material and a lime compound such as lime oxid, lime hydrate or lime carbonate to said spaces, and superimposing in surface contact with the ground on the spaces so treated, an opaque, dark colored, waterproof covering of paper or fabric.

13. The method of increasing the yield and reducing the production cost of rows of sugar-cane, which consists in creating nitrate beds in the spaces of ground between the cane rows by applying a lime compound to said spaces, and superimposing in surface contact with the ground on the spaces so treated, an opaque, dark colored, waterproof covering of paper or fabric.

14. The method of increasing the yield and reducing the production cost of rows of sugar-cane, which consists in creating a supply of nitrate from the natural organic matter of the soil of the ground spaces between the rows of cane by embedding a calcareous core in the soil of said ground spaces and by raising the average soil temperature of said ground spaces by means of a solar heat absorbing medium which is opaque, dark colored, and waterproof and which is superimposed in surface contact with said ground spaces.

15. The method of increasing the yield and reducing the production cost of rows of sugar-cane, which consists in creating nitrate beds in the alternate spaces of ground between the cane rows by furrowing said spaces, applying a mixture of organic material and a lime compound to the furrows, completing the filling in of said furrows by the addition of soil, and in superimposing an opaque, dark colored, waterproof covering of paper or fabric in surface contact with the ground of said spaces.

16. The method of increasing the yield and reducing the production cost of rows of sugar-cane, which consists in creating nitrate beds in the alternate spaces of ground between the cane rows by furrowing said spaces, applying a lime compound such as lime oxid, lime hydrate or lime carbonate to the furrows, completing the filling in of said furrows by the addition of soil, and in superimposing an opaque, dark colored, waterproof covering of paper or fabric in surface contact with the ground of said spaces.

17. The method of increasing the yield and reducing the production cost of rows of sugar-cane, which consists in creating nitrate beds in the alternate spaces of ground between the cane rows by applying a mixture of organic material and a lime compound such as lime oxid, lime hydrate or lime carbonate to said spaces, and superimposing in surface contact with the ground on the spaces so treated, an opaque, dark colored, waterproof covering of paper or fabric.

18. The method of increasing the yield and reducing the production cost of rows of sugar-cane, which consists in creating nitrate beds in the alternate spaces of ground between the cane rows by applying a lime compound to said spaces, and superimposing in surface contact with the ground on the spaces so treated, an opaque, dark colored, waterproof covering of paper or fabric.

In testimony whereof I affix my signature.

CHARLES FRANKLIN ECKART.